(12) United States Patent
Hojjatie et al.

(10) Patent No.: US 8,034,318 B1
(45) Date of Patent: Oct. 11, 2011

(54) PROCESS FOR PREPARATION OF CALCIUM THIOSULFATE LIQUID SOLUTION FROM LIME, SULFUR, AND SULFUR DIOXIDE

(75) Inventors: Michael Massoud Hojjatie, Tucson, AZ (US); Yelena Feinstein, Tucson, AZ (US); Constance Lynn Frank Lockhart, Tucson, AZ (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 0 days.

(21) Appl. No.: 12/764,843

(22) Filed: Apr. 21, 2010

(51) Int. Cl.
*C01B 17/64* (2006.01)
(52) U.S. Cl. .................................. 423/514; 423/243.08
(58) Field of Classification Search ................... 423/514, 423/243.08
See application file for complete search history.

(56) References Cited

U.S. PATENT DOCUMENTS

| | | | |
|---|---|---|---|
| 3,538,681 A | 11/1970 | Cantrell et al. | |
| 3,615,165 A | 10/1971 | Clement | |
| 3,630,672 A | 12/1971 | Potts | |
| 3,640,053 A | 2/1972 | Gustavsson | |
| 3,644,087 A | 2/1972 | Urban | |
| 3,671,185 A | 6/1972 | Lefrancois et al. | |
| 3,687,615 A | 8/1972 | Gorin et al. | |
| 4,105,754 A * | 8/1978 | Swaine et al. | 423/514 |
| 4,156,656 A | 5/1979 | Dannenberg et al. | |
| 4,976,937 A | 12/1990 | Lee et al. | |
| 6,159,440 A | 12/2000 | Schoubye | |
| 6,984,368 B2 | 1/2006 | Hojjatie et al. | |
| 7,572,317 B2 | 8/2009 | Choi et al. | |
| 2004/0247518 A1 * | 12/2004 | Hajjatie et al. | 423/514 |

FOREIGN PATENT DOCUMENTS

| | | |
|---|---|---|
| EP | 0 436 890 | 7/1991 |
| EP | 1 526 113 | 4/2005 |
| FR | 2 454 271 | 11/1980 |
| JP | SHO 48-6039 | 2/1973 |
| WO | 01/80646 | 11/2001 |

OTHER PUBLICATIONS

Saad et al., "Influence of thiosulfate on nitrification, denitrification, and production of nitric oxide and nitrous oxide in soil", Biol Fertil Soils, 21(3):152-159 (Jan. 1996).
European Search Report for European Patent Application No. EP 06 735 550 dated Mar. 9, 2011.

* cited by examiner

*Primary Examiner* — Timothy Vanoy
(74) *Attorney, Agent, or Firm* — Fennemore Craig, P.C.; Susan Stone Rosenfield

(57) ABSTRACT

An efficient batch or semi-continuous method of production of relative high concentration, low byproduct-containing, calcium thiosulfate ($CaS_2O_3$) from lime, sulfur or calcium polysulfide, and sulfur dioxide under elevated reaction temperature conditions is described. The product is an emulsion of liquid calcium thiosulfate and solid byproducts. Under the conditions of the art, including the mole ratios of lime to sulfur, the temperature of the reaction process and the sulfur dioxide reaction conditions, including rate and duration, the byproducts are reduced to about 2% by weight.

47 Claims, 4 Drawing Sheets

PROCESS FOR PREPARATION OF CALCIUM THIOSULFATE LIQUID SOLUTION FROM LIME, SULFUR, AND SULFUR DIOXIDE

FIELD OF INVENTION

The present invention is directed to a process for the preparation of calcium thiosulfate, a plant nutrient solution. Another aspect of the present invention is the removal of air pollutant sulfur dioxide from industrial plants producing it, to convert the sulfur dioxide to calcium thiosulfate.

DESCRIPTION OF RELATED ART

The thiosulfate ion, $S_2O_3^{2-}$, is a structural analogue of the $SO_4^{2-}$ ion in which one oxygen atom is replaced by one S atom. However, the two sulfur atoms in $S_2O_3^{-2}$ are not equivalent. One of the S atoms is a sulfide-like sulfur atom that gives the thiosulfate its reducing properties and complexing abilities.

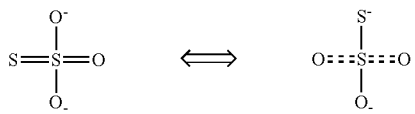

Thiosulfates are used in leather tanning, paper and textile manufacturing, flue-gas desulfurization, cement additives, dechlorination, ozone and hydrogen peroxide quenching, coating stabilizers and so on.

Due to these complex-forming abilities with metals, thiosulfate compounds have been used in commercial applications such as photography, waste treatment and water treatment applications.

Thiosulfates readily oxidize to tetrathionates and sulfates:

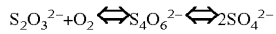

Due to this transformation, thiosulfates are used as fertilizers in combinations with cations such as ammonium, potassium, magnesium and calcium. The ammonium, alkali metal and alkaline earth thiosulfates are soluble in water. Water solubilities of thiosulfates decrease from ammonium to alkali metals to alkaline earth thiosulfates, i.e. ammonium thiosulfate has the highest relative water solubility and alkaline earth thiosulfates have relatively the lowest.

Calcium is an essential plant nutrient. Calcium availability is essential in the biochemistry of plants and, as recently discovered, improves the nitrogen fertilizer efficiency of surface-applied urea. This is not to be confused with the role of important soil amendments such as lime or gypsum with the need of soluble calcium by high-value crops. Both are extremely important in soil fertility and plant nutrition and complement each other.

Calcium has been applied as a foliar agent in apple orchards as a preventive to a physiological problem known as "bitter pit" which is caused by calcium deficiency. Calcium is also important to potato, tomato, lettuce, carrot, alfalfa and other fruit and vegetable production. Tomato plants with calcium deficiency show severe infection with *Fusarium oxysporum*, the fungal pathogen that causes wilt and crown rot in tomatoes.

Although soluble calcium could be attained from calcium nitrate, calcium chloride and calcium ammonium nitrate, due to the $NO_3^-$, or $Cl^-$ anion presence, a more environmentally-friendly counter ion such as thiosulfate ($S_2O_3^{-2}$) is desirable in the application of calcium fertilizer products. Calcium thiosulfate is referred to herein as "CaTs". CaTs is a registered trademark of Tessenderlo Kerley, Inc.

Although calcium thiosulfate has been known for many years and has many references in the literature, there are not many known commercial methods that employ inexpensive raw materials to produce high purity calcium thiosulfate with a low amount of byproducts and with solid residue of insoluble calcium salts which permit easy separation from the calcium thiosulfate product.

"Lime-sulfur" is a commonly used term for a calcium thiosulfate and calcium polysulfide mixture resulting from reaction of lime and sulfur. Preparation of "lime-sulfur" via boiling of sulfur sludge from sulfuric acid plant and lime is described by P. Sivaprasad (India Pat. No. 163510, May 1987).

U.S. Pat. No. 4,976,937 (Lee) describes a method for sulfur dioxide removal from flue gases with sulfite oxidation inhibition. The presence of a small amount of thiosulfate, 0.008-0.3 wt %, in the wet scrubber inhibits the oxidation of sulfur dioxide to sulfates and therefore provides a scrubbing system that is non-scaling for gypsum, i.e., that does not result in the buildup of gypsum scale. The '937 patent describes that a calcium thiosulfate and calcium polysulfide mixture results from the reaction of lime and emulsified sulfur in the lime-slaking tank. It is mixed with sulfites and bisulfites that originally formed in the wet scrubber in the recycling tank. Calcium thiosulfate forms from the reaction of polysulfide, sulfites, and bisulfites at 82° C.-88° C. (180° F.-190° F.) during 5-25 minute intervals. However, the concentration of calcium thiosulfate is only 0.3 wt %.

U.S. Pat. No. 3,644,087 (Urban) discloses a process for the removal of sulfur dioxide ($SO_2$) from gas streams containing $SO_2$ and oxygen ($O_2$) by converting $SO_2$ to the corresponding thiosulfate, whilst preventing the buildup of undesirable byproducts, e.g. sulfates, which otherwise occurs due to the reaction of oxygen from the input gas stream with the water-soluble sulfite that is formed when the $SO_2$ is absorbed in the scrubbing solution. Urban's process involves adding a reducing agent such as hydrogen sulfide, finely divided sulfur or an alkaline earth polysulfide into the gas scrubbing zone, wherein the scrubbing solution can be a water-soluble alkaline earth hydroxide. Calcium hydroxide, which is only slightly water-soluble, is not listed as an example for the scrubbing solution. This patent does not relate to the production of calcium thiosulfate.

EPO 0436890A1 (Lee) discloses a process for removing $SO_2$ from flue gases using an aqueous slurry of alkaline earth metal compounds, wherein thiosulfates are produced and recycled for use in the process to inhibit the oxidation of sulfites (which forms undesirable byproducts that cause buildup). Lee discusses that lime and emulsified sulfur are reacted to produce calcium thiosulfate and calcium polysulfide. One of Lee's preferred slurries of the alkaline earth metal compounds is formed from a mixture of calcium hydroxide and magnesium hydroxide. Lee is not concerned with producing calcium thiosulfate for recovery as a product.

U.S. Pat. No. 4,105,754 (Swaine, Jr.) describes the production of calcium thiosulfate by a metathesis reaction of ammonium thiosulfate and calcium hydroxide or calcium oxide. This approach requires constant removal of ammonia by air stripping at below the boiling point of the mixture and capturing the gas. Further, not all the ammonia can be removed by this process, and as a result, the resulting calcium thiosulfate tends to have a lingering ammonia odor and/or contamination with ammonia or ammonium thiosulfate.

Japan Patent No. 6,039 issued in 1973 describes preparation of calcium and magnesium thiosulfate by treating sulfur and the corresponding sulfite in an alkaline solution. High yields only are obtained only with magnesium thiosulfate. This patent also described the formation of calcium thiosulfate from salt exchange process between magnesium thiosulfate and calcium hydroxide.

U.S. Pat. No. 4,156,656 (Dannenberg) describes the reaction of oxides or hydroxides of alkali and alkaline-earth metals with sulfur in aqueous media at elevated temperature (200° C.-250° C.) and pressure (210-560 psig) to produce a hydrosulfide solution.

Japan Patent No. 48,006,039 discloses a process for the manufacturing of calcium and magnesium thiosulfate by reacting calcium and/or magnesium sulfite with sulfur in alkaline solution. High yield is only obtained in the preparation of magnesium thiosulfate, and the preparation of calcium thiosulfate requires a difficult filtration of a slurry containing magnesium hydroxide.

Spain Patent No. 245,171 discloses the use of the salt-exchange process with sodium thiosulfate and calcium chloride. The byproduct of this approach is a large amount of sodium chloride that also contaminates the resulting calcium thiosulfate.

Russia Patent No. 1,773,866 discloses an ion-exchange technology for preparation of calcium thiosulfate involving contacting calcium chloride solution with a strong acidic cation-exchange resin in $H^+$ form, and unloading the adsorbed calcium with sodium thiosulfate solution. The calcium thiosulfate product formed in this way is contaminated with sodium chloride, calcium chloride and sodium thiosulfate.

U.S. Pat. No. 7,572,317 (Choi) describes a method for leaching gold and other precious metals using elemental sulfur to convert the precious metals to their sulfidic metal bearing material, and oxidizing this at high pressure and temperature to form thiosulfate salts of the metals. Calcium thiosulfate of the precious metals was formed by addition of lime. The thiosulfate of precious metal is then converted to precious metal cyanide and the metal is leached.

U.S. Pat. No. 6,984,368 (Hojjatie) describes the production of calcium thiosulfate in high yield and with low solid byproducts from oxidation of calcium polysulfide at elevated temperature. However, the '368 patent does not utilize sulfur dioxide.

Sulfur dioxide is a common air pollutant which forms due to combustion processes and burning of fossil fuels containing sulfur. Many industries contribute to the emission of sulfur dioxide in the atmosphere in the United States. Chief among these industries are: electric power plants (42%), coal (4%), oil (17%), refinery operations (5%), smelting of ores (12%), coke processing (2%), and sulfuric acid manufacture (2%). The maximum allowable concentration of sulfur dioxide ($SO_2$) in the air is about 5 ppm. However, sulfur dioxide may be toxic to vegetation in concentrations of about 2 to 3 ppm and corrosive to materials made of metal.

The principle methods used to limit sulfur dioxide emissions are (a) use of low-sulfur fuels, (b) removal of sulfur from fuel before combustion, (c) removal of sulfur dioxide after chemical combustion processes, and (d) modification of chemical combustion processes.

Numerous methods have been developed to remove sulfur dioxide for chemical combustion processes involving sulfur dioxide. The following are examples of such methods: Absorption into dimethyl sulfoxide (DMSO, U.S. Pat. No. 3,538,681), absorption in molten alkaline metals carbonate salts such as lithium, sodium, and potassium carbonate at 1500° F.-2000° F. (U.S. Pat. No. 3,671,185) and recovery as hydrogen sulfide, absorption into potassium polyphosphate solution to form potassium polysulfide (U.S. Pat. No. 3,630,672), absorption into soda caustic or hydrated lime to form waste sodium sulfate or calcium sulfate (U.S. Pat. No. 3,640,053), absorption into salts such as formate salts of ammonium, sodium, and potassium at 457° F. to form hydrogen sulfide, carbon dioxide, and carbonate salts of these metals (U.S. Pat. No. 3,687,615), and recovery as ammonium sulfate fertilizer (U.S. Pat. No. 3,615,165).

BRIEF SUMMARY OF THE INVENTION

The present invention relates to processes for the production of calcium thiosulfate by (1) reacting sulfur dioxide ($SO_2$) with sulfur (S) and hydrated lime [i.e., calcium hydroxide, $Ca(OH)_2$], or (2) by reacting $SO_2$ with lime-sulfur or calcium polysulfide. The invention further relates to the foregoing reactions being conducted under certain conditions, to produce a solution of calcium thiosulfate having a high concentration and with low byproduct formation.

Liquid solutions containing high concentrations of calcium thiosulfate can be prepared in accordance with the present invention, having only minimal quantities of solid byproducts and unreacted sulfur in the manner of batch reaction, or via a semi-continuous reaction process. The invention involves the use of specific conditions for the reaction, for example the use of certain molar ratios of the raw materials, reaction time and temperature, which reduces the formation of undesirable calcium sulfate byproduct and produces CaTs at a high concentration and high purity level.

In one embodiment of the invention, calcium hydroxide slurry is introduced to the process reactor, elemental sulfur is added to this slurry, and the mixture is heated while agitating. The mixture is brought to a temperature suitable for reaction with sulfur dioxide gas under conditions sufficient to produce calcium thiosulfate.

In another embodiment of the invention, a contactor/reactor apparatus is provided for reacting sulfur dioxide with a slurry, wherein the slurry is a CaO slurry, a $Ca(OH)_2$ slurry, or a lime-sulfur slurry, to prepare a calcium thiosulfate solution. If the aforementioned slurry is a CaO or a $Ca(OH)_2$ slurry, then sulfur is added to the slurry. The apparatus comprises (i) a bubble column for providing contact between sulfur dioxide gas bubbles and liquid/slurry; (ii) a mechanical agitator for dispersing the gas bubbles within the bubble column; (iii) a venturi, having an ejector/eductor for ejecting accumulated gas at the top portion of the bubble column and educting the gas through a venturi, wherein the venturi contacts the gas with a recirculated portion of the liquid/slurry; and (iv) a pipe/tube contactor in contact with the venturi for contacting the gas and a recirculated portion of the liquid/slurry mixture and returning the mixture to the bottom portion of the bubble column.

The present invention may use sulfur dioxide that is obtained as a byproduct of industrial operations such as mining, coke processing, oil and gas refineries and power generation plants. For example, the sulfur dioxide used in the present invention may be obtained via recovery from incineration of sulfur-bearing gases from oil refineries.

In yet another aspect of the invention, a semi-continuous approach is designed for the removal of sulfur dioxide tail gas from chemical processing units, power generation industries and mining industries, and using that sulfur dioxide in a process for producing high concentration liquid calcium thiosulfate product. In a specific embodiment, the sulfur dioxide is continuously removed and immediately used in a process as described herein, to produce the calcium thiosulfate product.

BRIEF DESCRIPTION OF THE DRAWINGS

The present invention will now be described in more detail with reference to preferred embodiments of the invention, given by way of examples, and illustrated in the accompanying drawings in which.

DETAILED DESCRIPTION OF THE INVENTION

Figure 1:
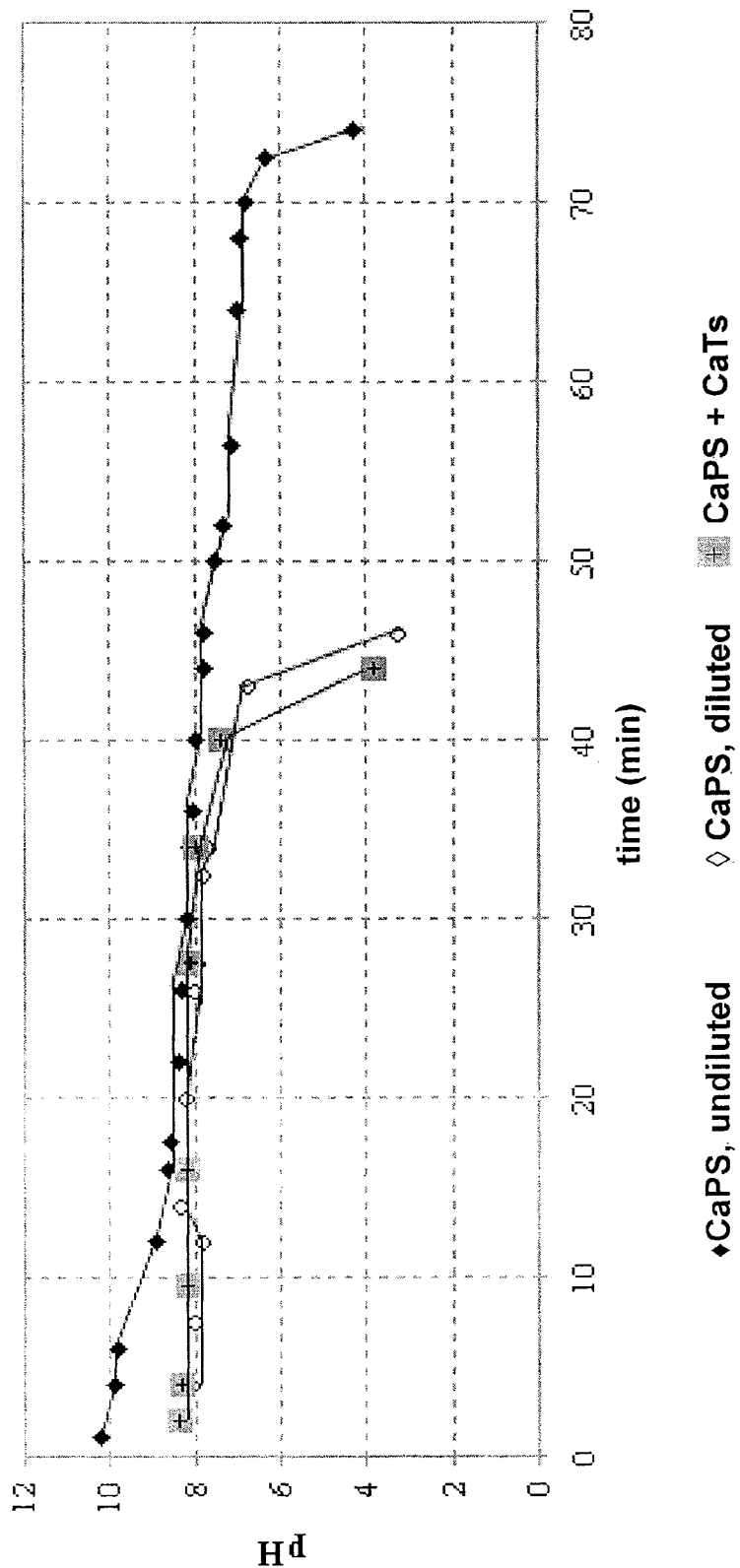
FIG. 1 is a graphical illustration of the process kinetics for calcium thiosulfate preparation from a calcium polysulfide slurry and sulfur dioxide as a function of pH versus time.
Figure 2:
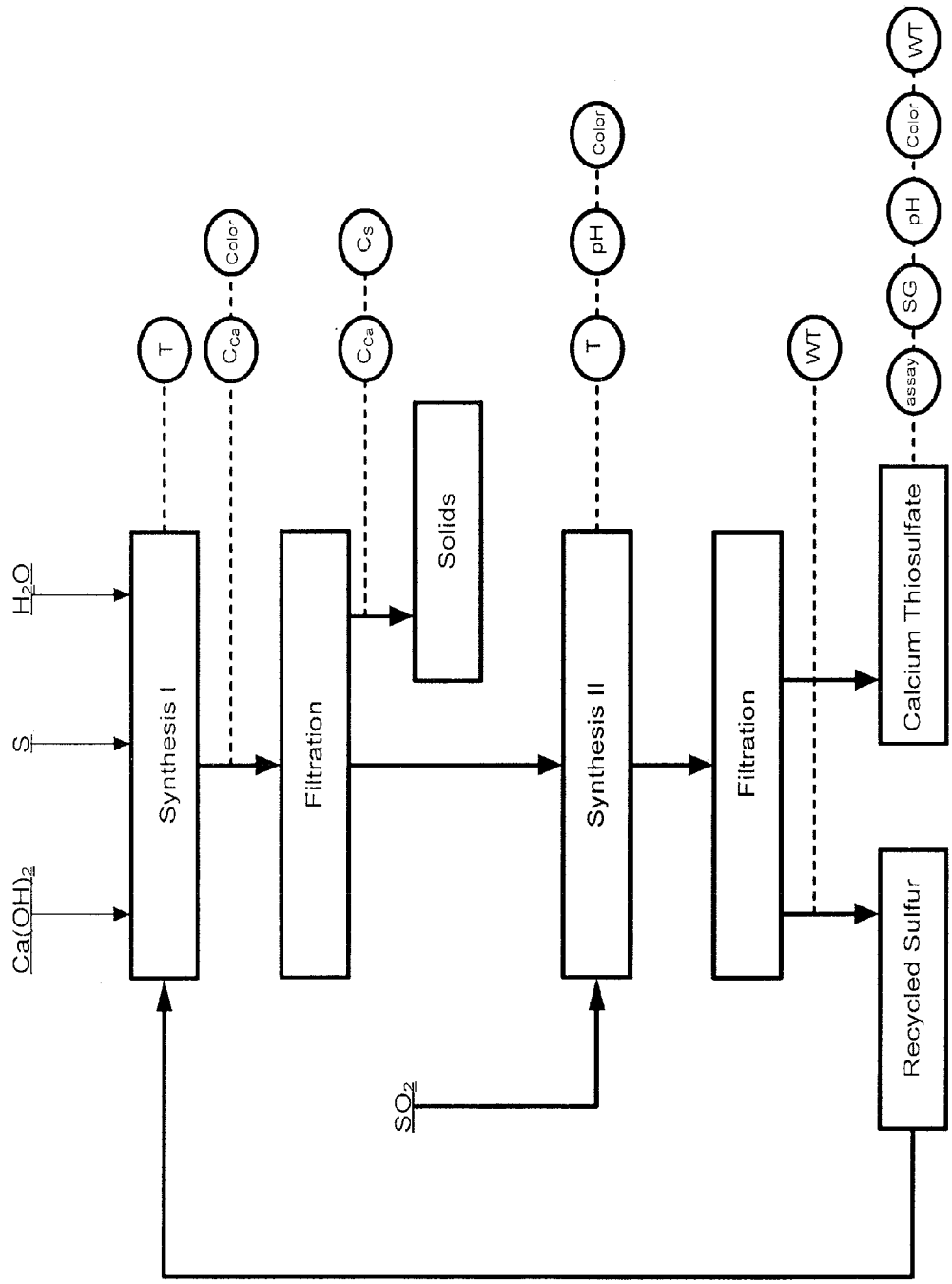
FIG. 2 is a graphical illustration of the process control of calcium thiosulfate solution preparation.

The present invention relates to a process for preparing calcium thiosulfate by reacting sulfur dioxide with a slurry of calcium hydroxide, lime-sulfur or calcium polysulfide. More specifically, the invention relates to a process for preparing calcium thiosulfate utilizing particular reactants and reaction parameters and conditions. The present invention provides a process for the preparation of high purity, concentrated calcium thiosulfate. The calcium thiosulfate produced according to this invention does not require further concentration by evaporation or other means, and is useful as an agricultural nutrient.

The production of calcium thiosulfate according to the invention is conducted in a single reaction vessel or, alternatively, in a series of reaction vessels and holding tanks to facilitate a semi-continuous reaction. The process of the invention includes a series of process steps, which can be implemented in equipment designed to provide the desired process conditions.

The process steps can be accommodated in a single reaction vessel with the appropriate auxiliary equipment (pumps, piping, valves, heat exchangers, filters, controls, etc.) to produce one single batch at a time. Alternatively, the process steps can be carried out in a series of reaction vessels and holding tanks to facilitate a semi-continuous production arrangement.

Advantageously, described herein is a process by which calcium thiosulfate can be prepared from inexpensive raw materials, such as lime (calcium oxide, CaO) and sulfur. A further advantage is that the invention provides a way to utilize sulfur dioxide recovered from flue gas (tail or waste gas) from power plants, the mining industry or other industries, to make the non-hazardous plant nutrient calcium thiosulfate.

The following equations illustrate alternative processes for making CaTs according to the invention.

Using lime (calcium oxide, CaO) as calcium source:

$$CaO+S+SO_2 \rightarrow CaS_2O_3$$

Using hydrated lime (calcium hydroxide, $Ca(OH)_2$) as calcium source:

$$Ca(OH)_2+S+SO_2 \rightarrow CaS_2O_3+H_2O$$

Using lime-sulfur (mixture of calcium polysulfides, $CaS_x$, and calcium thiosulfate, $CaS_2O_3$) as calcium source:

$$CaS_x+CaS_2O_3+SO_2+H_2O \rightarrow 2CaS_2O_3+H_2S+(x-2)S$$

Using calcium polysulfide ($CaS_x$) as calcium source:

$$CaS_x+SO_2+H_2O \rightarrow CaS_2O_3+H_2S+(x-2)S$$

The process of the invention may be carried out according to the following preferred reaction conditions and parameters.

If either lime (CaO) or hydrated lime [$Ca(OH)_2$] is used as the calcium source, a slurry of the lime or hydrated lime in water is first provided, and then sulfur is added to the slurry. Lime must be converted to hydrated lime by slaking, i.e. by mixing with water. Either a pre-existing slurry of hydrated lime is used, or a slurry is formed by mixing lime with water to form hydrated lime. In a preferred embodiment, the lime is about 96% to about 99% pure.

Preferably, the mixture of sulfur and the slurry is heated. In a preferred embodiment, it is heated to at least about 70° C. (about 158° F.). More preferably, it is heated to a temperature in the range of about 85° C. to about 99° C. (about 185° F.-210° F.). Even more preferably, it is heated to a temperature in the range of about 90° C. to about 92° C. (about 195° F.-198° F.).

The sulfur is preferably combined with the calcium hydroxide at a sulfur to calcium hydroxide mole ratio of about 1:1 to about 6:1. More preferably, the mole ratio is about 3.5:1 to about 6:1. Still more preferably, the mole ratio is about 3.4:1 to about 3.8:1. Even more preferably, the ratio is about 3.6:1.

In a preferred embodiment, the mole ratio of sulfur to calcium hydroxide to water is at least about 2:6:30.

In another preferred embodiment, the mole ratio of sulfur to calcium hydroxide to water is about 3.6 to about 4.9:1:25.5.

In still yet another preferred embodiment, the mole ratio of sulfur to calcium hydroxide to water is about 3.6:1:25.5.

If the sulfur to calcium hydroxide to water ratio used is about 3.6:1:25.5, then the reaction takes about 2-6 hours to complete.

Sulfur dioxide is then added to the slurry, which now contains calcium polysulfides as the result of the reaction of calcium hydroxide and sulfur. Prior to the addition of sulfur dioxide, the calcium polysulfide reaction mixture slurry typically will require cooling. Cooling may be by external cooling or other means known to one of skill in the art. Cooling is used to avoid decomposition of the calcium thiosulfate that has formed and to avoid loss of sulfur dioxide due to evaporation or boiling off. In a preferred embodiment, the calcium polysulfide reaction mixture is cooled to a temperature of about 55° C. to about 75° C. (about 131° C.-167° C.) before the addition of sulfur dioxide.

The reaction mixture may optionally be subjected to further cooling during and/or after addition of the sulfur dioxide to maintain the temperature of the reaction mixture below a certain temperature, to avoid decomposition of the calcium thiosulfate formed and to avoid loss of sulfur dioxide by boiling off. For example, when the sulfur dioxide is added, it is preferable to maintain the temperature of the reaction mixture at about 82° C. to about 95° C. (about 180° F.-203° F.). Still more preferably, the reaction mixture is maintained at about 85° C. to about 88° C. (about 185° F.-190° F.).

Preferably, when the sulfur dioxide is added, the pH is adjusted to about 3-6, or still more, preferably to about 3.5-4.

In the preferred practice of the invention, only minor quantities of byproducts are formed. These residual byproducts generated during lime-sulfur production and subsequent reaction with sulfur dioxide typically contain calcium sulfite, calcium sulfate, and elemental sulfur. If metal oxides are present in the lime (calcium oxide) raw material, some metal sulfides could be present as well after the reaction is complete. Higher purity calcium oxide typically contains lower amounts of metal oxides. Calcium carbonate and silica impurities may accompany commercial grade calcium oxide. These impurities usually amount to less than 2% by weight of the final calcium thiosulfate solution when a high grade of calcium oxide is utilized and the formulation and reaction conditions are adequately controlled. Therefore, a preferred embodiment of the invention uses a high grade lime as a starting material.

Residual reaction byproducts, raw material impurities, and unreacted raw materials in the calcium thiosulfate solution can form solid particulate byproduct matter, which preferably is filtered out in order to provide a clear, solid-free calcium thiosulfate product solution. Particulate materials, such as calcium sulfate, calcium sulfite, calcium carbonate, metal sulfides, elemental sulfur, and silicate impurities can be filtered more efficiently by adjusting pH and by choosing an appropriate flocculent.

The invention includes a series of process steps, which can be implemented in equipment designed to provide the desired process conditions. The process steps can be accommodated in a single reaction vessel with the appropriate auxiliary equipment (pumps, piping, valves, heat exchangers, filters, controls, etc.) to produce one single batch at a time. The process steps alternatively can be carried out in a series of continuously stirred reaction tanks (CSRT) with appropriate auxiliary equipment to facilitate a continuous production arrangement.

The process steps for the batch production could be subdivided into three sections: lime slaking, reaction, and filtration.

The process steps for semi-continuous production consist of repeatable cycles. Each cycle preferably consists of two steps as described herein.

As described herein, the present invention utilizes a series of reactions between lime or slaked lime, sulfur, and sulfur dioxide (or between lime-sulfur or calcium polysulfide and sulfur dioxide) using reaction conditions as described herein, such as raw material, molar ratios, temperature, pH control, reaction time, and equipment configuration, to produce high purity and concentrated calcium thiosulfate without further need for concentration by evaporation. Advantageously, calcium thiosulfate can be prepared according to the invention from inexpensive raw materials, such as lime and sulfur, as well as sulfur dioxide, an environmentally hazardous gas that is often present in industrial flue gases.

In an embodiment of the invention, color changes in the reaction mixture are used to observe the progress of the reaction. For example, lime-sulfur and polysulfide are typically intensely red colored, and as they react with sulfur dioxide, the reaction mixture turns to a yellowish color, and then to a grey-green color. The grey-green color indicates that the calcium thiosulfate product in high concentration has been achieved.

The following describes the preparation of calcium thiosulfate according to one embodiment of the invention, wherein hydrated lime is used as the calcium source.

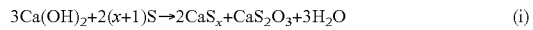

$3Ca(OH)_2 + 2(x+1)S \rightarrow 2CaS_x + CaS_2O_3 + 3H_2O$ (i)

(for example, if x=4: $3Ca(OH)_2 + 10S \rightarrow 2CaS_4 + CaS_2O_3 + 3H_2O$)

(molar ratio S:Ca(OH)$_2$~3.3:1)

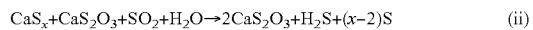

$CaS_x + CaS_2O_3 + SO_2 + H_2O \rightarrow 2CaS_2O_3 + H_2S + (x-2)S$ (ii)

Reaction (i) describes a way of making calcium polysulfide with a relatively low content of calcium thiosulfate. The addition of reaction (ii) provides one of the processes according to the invention, for making calcium thiosulfate from sulfur dioxide and lime-sulfur (lime-sulfur being a mixture of calcium polysulfide and calcium thiosulfate).

The following is an example illustrating the production of CaTs according to the aforementioned process. Laboratory experiments were conducted in three- or four-neck flasks (the volume varied from 500 mL to 3 L), equipped with a mechanical agitator, pH probe, and thermometer. The flask was fitted with a KOH or caustic soda (NaOH) trap as a scrubber to capture vent gases. Heating was provided by a heating mantle. The SO$_2$ source was compressed, liquefied 100% SO$_2$.

Raw materials: 41.7 g Ca(OH)$_2$, 36.1 g S (S:Ca(OH)$_2$ molar ratio=2:1), and 200 g H$_2$O.

Step (i): the maximum expected concentration of Ca=8.1 wt %; reaction duration=120 min, temperature=80° C.-90° C. (176° F.-194° F.). The observed drop of pH was from 12.6 to 9.0.

Intermediate results: 3.96 wt % Ca, pH 11.5, SG—1.24,—all referred to the lime-sulfur solution.

Step (ii): duration=90 minutes, temperature range=30° C.-40° C. (86° F.-104° F.) (SO$_2$ sparging was started when the solution cooled down to 104° F.). The final product was amber yellow solution, specific gravity=1.32, pH=11.0, $C_{Ca}$ by EDTA titration=7.0 wt %, $C_{CaTs}$ by iodine titration=21.8 wt % (recalculated $C_{Ca}$=5.7 wt %; the rest of calcium was in the calcium polysulfide form). Solids were greenish-gray and comprised 22 wt % of the total weight of the final product. Solids contained 18 wt % of CaTs.

Yet another embodiment involves preparation of calcium thiosulfate also using hydrated lime, but via the following direct one-step reaction:

$Ca(OH)_2 + S + SO_2 \rightarrow CaS_2O_3 + H_2O$ (iii)

As follows from the preceding equation, the molar ratio of Ca(OH)$_2$:S should be 1:1. SO$_2$ sparging was started as soon as the temperature of Ca(OH)$_2$ slurry, mixed with sulfur, reached 180-190° F. Four hours of SO$_2$ sparging was required to bring the pH of the slurry down to 5.8 from pH 11.5.

The final product: assay=12.25 wt % CaTs by the EDTA titration, SG=1.12, pH=8.6. The solids, resulting from the vacuum filtration, comprised 31.4% of the total weight of the final product, which appeared to be unusually high. The inventors determined that the formation of CaSO$_3$ resulted from the reaction between Ca(OH)$_2$ and SO$_2$. Therefore, preferably, if there is any unreacted Ca(OH)$_2$ by the end of the lime-sulfur preparation, all solids should be removed from the reaction zone before reacting the lime-sulfur solution with sulfur dioxide, to avoid the production of CaSO$_3$. Otherwise, the amount of final solids will be increased by CaSO$_3$ byproduct (i.e., the purity of the CaTs will be lower, due to the presence of CaSO$_3$).

Yet another embodiment of the invention involves preparation of calcium thiosulfate by reacting calcium polysulfide with sulfur dioxide, as shown in the following reaction:

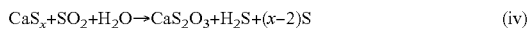

$CaS_x + SO_2 + H_2O \rightarrow CaS_2O_3 + H_2S + (x-2)S$ (iv)

The chemical description of this approach is identical to reaction (ii). The difference is in the source of CaS$_x$ and in its composition. As shown above, the process of calcium thiosulfate preparation from lime-sulfur solution consists of two steps (i) and (ii). If relatively pure calcium polysulfide (CaS$_x$) is used as a starting material as is proposed in reaction (iv) above, rather than lime-sulfur, the tendency to form byproducts is significantly reduced.

Three variations of that process were performed. The starting material CaS$_{4.5}$ ($C_{Ca}$=9.66 wt %, SG=1.48) was used as a starting material. The product contained about 25 wt % calcium thiosulfate but yield was about 25%. In the next experiment the calcium polysulfide was diluted to contain about 7 wt % Ca. The product contained 28 wt % calcium thiosulfate and the yield was 34%. In the third experiment full strength calcium polysulfide (9.66 wt % Ca) was used but some calcium thiosulfate (about 5 wt %) was added with the hope that presence of calcium thiosulfate would accelerate the process. The product contained 25 wt % calcium thiosulfate and the yield was 49%.

The kinetics of these three experiments as a function of pH vs. reaction time is shown in FIG. 1. These plots consist of two portions, straight line and steep drop of pH. The transition from straight line to pH drop corresponds to pH values of 7.5-8.0. The pH appeared to be the most objective monitoring factor and was used as the control parameter for the endpoint of the process.

An example of a preferred embodiment of the invention involves preparation of calcium thiosulfate from lime-sulfur solution.

Listed below are the general characteristics of the calcium thiosulfate preparation process from a lime-sulfur solution, by reacting the lime-sulfur solution with sulfur-dioxide, as shown in the following reaction:

$$CaS_x + CaS_2O_3 + SO_2 + H_2O \rightarrow 2CaS_2O_3 + H_2S + (x-2)S$$

1. The calculated concentration of calcium from $Ca(OH)_2$ at the beginning of the (i) step was 8.1 wt %.
2. $S:Ca(OH)_2$ molar ratio was 2:1.
3. The reaction temperature during the (i) step was approximately (about) 80° C. (176° F.) +/−2° C.
4. The reaction duration of the (i) step was variable (for example, 120 and 153 min), 2.5 hr on the average, but the longer the (i) step, the higher is $C_{Ca}$ in the lime-sulfur solution (Table 1, below). The average duration of the whole process was 3.5-4.0 hr.
5. pH was a control parameter of the process.

The kinetic curves, pH versus time, are shown in FIG. 1. This shows that during the step (i), pH of the slurry was gradually decreased to 9.7. The step (ii) corresponded to a wide straight line preceding a rapid drop of pH which occurred in less than 10 minutes.

6. pH was also a monitoring factor to determine the endpoint of $SO_2$ sparging. Sparging was stopped when pH of the slurry reached 3.8-4.0.
7. In addition to pH, the color of the slurry was another control parameter of the process.

During step (i), the color of the reaction mixture changed from the initial whitish to pale yellow, then to an intensive yellow, and finally to brownish-yellow. This was interpreted as accumulation of calcium polysulfide. During step (ii), the brownish-yellow color was converted back to yellow and remained nearly unchanged, along with stabilized pH. The sudden drop of pH was accompanied with rapid change of color; the intensity of yellow gradually disappeared and finally the solution became whitish-gray.

The maximum concentration of calcium ($C_{Ca}$) in the lime-sulfur solution by the end of step (i) was 4.82 wt %. Calcium thiosulfate concentration ($C_{CaTs}$) in the final solution was 21.8-25.4 wt % and calcium polysulfide concentration ($C_{CaPS}$, as $CaS_2$) was less than 3.7 wt % (later $SO_2$ sparging was prolonged to lower the pH to 3.8-4.0). SG<1.38, pH=10-11. Solids amounted to 14 wt %. Solids contained about 17 wt % calcium thiosulfate. Kinetic data of the (i) step are shown in Table 1.

TABLE 1

Kinetics of the process for lime-sulfur preparation

| | Time, min | | | | | | |
|---|---|---|---|---|---|---|---|
| | 7 | 40 | 70 | 87 | 96 | 128 | 153 |
| SG | 1.08 | 1.08 | 1.08 | 1.11 | 1.14 | 1.22 | 1.26 |
| $C_{Ca}$, wt % | 0.12 | 0.22 | 0.74 | 1.4 | 1.82 | 3.57 | 4.82 |

As mentioned before, the inventors determined that pH is one of the factors in monitoring the reaction. It was found that if pH would be allowed to drop as low as possible, but still was above the critical value (the critical pH is approximately 4, or more precisely at pH 3.8-4, below which calcium thiosulfate decomposes), partial dissolving of $CaSO_3$ (CaS and $CaSO_4$ if any) could be obtained, and as a result a further reduction of the amount of solids could be obtained. The inventors determined that sulfur dioxide should be purged into the solution until the pH drops to about 3.8 to about 4.0.

The inventors also determined that the purity of lime is also another factor in reducing the amount of solid byproducts. They determined that the use of higher purity lime resulted in a reduced amount of byproduct solids. Preferably, the lime is about 96% to about 99% pure. The amount of byproduct solids was decreased to 6 wt % of the total product with higher purity lime. The reaction time also decreased when higher purity lime was used.

The inventors also determined what pH is needed to prevent calcium thiosulfate decomposition in the acidic medium according to equation:

$$S_2O_3^{2-} \rightarrow HSO_3^- + S°$$

Fourier Transform Infrared Spectroscopy (FTIR) studies proved that even at pH 4 the product is still calcium thiosulfate and not calcium bisulfite.

Calcium thiosulfate solution can be distinguished from $Ca(HSO_3)_2$ solution visually, as well. Calcium thiosulfate is a colorless, sometimes cloudy and practically odorless solution. $Ca(HSO_3)_2$ is yellow with the strong $SO_2$ smell typical of bisulfite solutions.

Preferred process parameters according to the invention are as follows:

$S:Ca(OH)_2$ molar ratio. The inventors determined preferred $S:Ca(OH)_2$ molar ratios for the process, in correlation with the duration of the process and amount of solids produced, as follows:

The higher the molar ratio, the shorter the reaction time required (the endpoint attainment of $C_{Ca}$, approximately 6.5 wt % Ca, correlates to 24.7 wt % calcium thiosulfate);

The molar ratio 5:1 resulted in the maximum concentration of calcium: $C_{Ca}$=6.94 wt % (recalculated equivalent calcium thiosulfate concentration=26.4 wt %);

The molar ratio 4:1 resulted in the minimum amount of remaining solids and still satisfactory $C_{Ca}$=6.60 wt % (the predicted calcium thiosulfate concentration was 25.1 wt %).

99% lime purity was chosen for optimization of the $S:Ca(OH)_2$ molar ratio to exclude formation of solids due to impurities associated with lower quality lime. The amounts of $Ca(OH)_2$ and $H_2O$ were constant in all the experiments (42.56 g $Ca(OH)_2$ and 263.34 g $H_2O$). The amount of sulfur was variable. The conditions of the experiment were as follows:

temperature: about 96° C.-99° C. (205° F.-210° F.) (near the boiling point);
duration: 40 min after the temperature reached 200° F.;
immediate vacuum filtration of the hot final product;

weighing solids immediately after filtration, without air drying.

The optimization of the molar ratio was judged by the following parameters:

1. Relative amount of solids (%) related to the total amount of the final lime-sulfur product (a sum of the weight of filtered lime-sulfur solution and solids). Loss was not included.
2. Concentration of calcium in the lime-sulfur solution (wt %).
3. Recovery of calcium (%) as the total amount of calcium in the lime-sulfur solution, related to the amount of calcium in the lime starting material. Calculation was based on 100% $Ca(OH)_2$.

Results are shown in Table 2.

TABLE 2

Optimization of the $S:Ca(OH)_2$ Molar Ratio.

| # | $S:Ca(OH)_2$ molar ratio | Relative amount of solids, % | $C_{Ca}$ in the lime-sulfur solution, wt % | Recovery of Ca, % | Loss, g |
|---|---|---|---|---|---|
| 1 | 1.00 | 10.9 | 2.66 | 31.7 | 16.0 |
| 2 | 1.92 | 6.5 | 4.36 | 58.0 | 13.7 |
| 3 | 2.87 | 3.1 | 5.71 | 82.5 | 15.7 |
| 4 | 3.00 | 2.7 | 5.83 | 86.3 | 11.0 |
| 5 | 3.20 | 1.7 | 6.17 | 91.6 | 17.1 |
| 6 | 3.40 | 1.3 | 6.22 | 95.9 | 9.2 |
| 7 | 3.45 | 1.5 | 6.50 | 97.3 | 19.8 |
| 8 | 3.60 | 0.5 | 6.46 | 100.0 | 8.1 |
| 9 | 3.80 | 0 | 6.59 | 100.0 | 9.1 |
| 10 | 3.83 | 0.1 | 6.73 | 100.0 | 16.4 |
| 11 | 4.02 | 0.5 | 6.57 | 100.0 | 14.5 |
| 12 | 4.02 | 0.2 | 6.50 | 100.0 | 18.3 |
| 13 | 5.00 | 6.0 | 6.70 | 100.0 | 17.0 |

The inventors determined that the preferred $S:Ca(OH)_2$ molar ratio is 3.6 to 3.8:1 (Table 2). This resulted in the minimal amount of solids (0-0.5%), 100% recovery of calcium, and therefore, the maximum possible $C_{Ca}$ was 6.46 wt %, which correlates to $C_{CaTs}$=24.5 wt %.

Solids analysis showed that when the molar ratio was less than 3.6 to 3.8:1, solids contained unreacted lime. The smaller the molar ratio, the larger was the percentage of unreacted lime.

Starting with molar ratio of 4.0, there was a noticeable amount of unreacted sulfur.

Table 3 shows the results of three different experiments in attempts to optimize the yield and minimize the amount of solid byproducts:

Experiment #3 was not completed due to the low recovery of calcium in step (i).

The inventors determined that the higher the $C_{Ca}$ was in the lime-sulfur parent solution, the higher the $C_{Ca}$ was in the calcium thiosulfate solution. This was true if $C_{CaTs}$ was less than about 27 wt %. The further increase of $C_{Ca}$ in the lime-sulfur solution did not influence $C_{CaTs}$, but resulted in the growth of the amount of solid.

The preferred temperature during the step (i) in which lime-sulfur is produced by reacting calcium hydroxide and sulfur is about 93° C. to about 99° C. (200° F.-210° F.) as described in U.S. Pat. No. 6,984,368.

The inventors determined that the duration of the step (i) appears to be dependent on molar ratio only (since temperature is not variable).

While using pure lime (99% or better) and pure sulfur with the optimal molar ratio of $S:Ca(OH)_2:H_2O$=(3.6-3.8):1:25.5, the endpoint of step (i) could be judged by the appearance of the solution. The endpoint is when the solution becomes dark reddish-brown and clear (no solid particles could be observed). Even while using a different kind of lime, when the reaction is completed, the color of the reacting mixture reaches a certain point and remains unchanged. While using recycled sulfur, it becomes more complicated to determine the endpoint by color, because impurities and contaminants in the sulfur tend to cause coloration of the solution, which makes determination of the endpoint more difficult.

$SO_2$ flow. Lime-sulfur solutions are absorbing $SO_2$ completely even at the highest flow rate (no carry over of $SO_2$ is monitored in the KOH or NaOH trap). Lab experiments utilized synthetic $SO_2$ gas. Industrial gas composition will be dilute, approximately 4-14 vol % of $SO_2$, with the balance consisting of nitrogen, oxygen, and other combustion products. $SO_2$ flow rate is not a limiting factor in step (ii).

Raw Materials

Different lime purities from different sources were tested and their effects were compared on the overall process. The lime purities were Source 1: >99 wt % $Ca(OH)_2$; Source 2: 97.40 wt % $Ca(OH)_2$; Source 3: 94.20 wt % $Ca(OH)_2$; and Source 4: 95.80 wt % $Ca(OH)_2$. The comparison was made in the following series of tests using pure sulfur (start-up operation):

pure sulfur: (67.0 g);
molar ratio: $S:Ca(OH)_2:H_2O$=3.8:1:25.5;
duration: 40 min after temperature reached 93.3° C. (200° F.);
temperature: 95° C.-96° C. (203° F.-205° F.). Solution was boiling;
immediate vacuum filtration of the hot final product;

TABLE 3

Preparation of the Maximum Concentrated Lime-Sulfur Solution.

| Experiment # | $Ca(OH)_2$, g | S, g | Expected $C_{Ca}$, wt %* | $C_{Ca}$ in the lime-sulfur solution, wt % | Relative amount of solids, % | Recovery of Ca, % | $C_{CaTs}$, wt %** |
|---|---|---|---|---|---|---|---|
| 1 | 52.0 | 81.02 | 7.11 | 7.26 | 1.0 | 99.0 | 27.45 |
| 2 | 59.7 | 93.02 | 7.76 | 7.99 | 1.1 | 97.2 | 27.0 |
| 3 | 70.0 | 109.07 | 8.56 | 8.17 | 8.9 | 70.8 | — |

*calculation is based on 100% recovery of Ca from lime in lime-sulfur solution
**real $C_{CaTs}$ in the final calcium thiosulfate solution, resulting from the corresponding lime-sulfur solution weighing solids immediately after filtration, without air drying.

The following characteristics were chosen for comparison of applicability of different lime purities:
1. Relative amount of solids (%) as absolute amount of solids, related to the total amount of the final lime-sulfur product (a sum of the weight of the final solution and solids. Loss, mostly due to evaporation, was not included. The average loss was approximately 20 g in each experiment).
2. Concentration of calcium in the lime-sulfur solution determined by EDTA titration (wt %).
3. Recovery of calcium (%) as the total amount of calcium in the lime-sulfur solution, related to the total amount of calcium in the lime starting material. Calculation was based on assumption for 100% $Ca(OH)_2$.

TABLE 4

Preparation of lime-sulfur solutions step (i) from different sources of lime and pure sulfur.

| Source of lime | Amount of solids, wt % | $C_{Ca}$, wt % | Recovery of Ca, % | Filtration |
|---|---|---|---|---|
| Source 1 | 0.295* | 6.65 | 100 | fast |
| Source 2 | 2.7 | 6.57 | 96.3 | very slow |
| Source 3 | 4.0 | 6.45 | 93.9 | very slow |
| Source 4 | 2.25 | 6.44 | 97.0 | slow |

*A second set of tests was performed to verify reproducibility. The results shown are averages. The conclusion showed that higher purity lime reacted more quickly and had less solid byproducts formed during the reaction.

Real Gas Mixture

In the commercial process $SO_2$ was produced by burning sulfur in air with a resulting gas mixture consisting of 14% $SO_2$, 3% $O_2$, and 83% $N_2$. The test was performed to record the effects of substitution of 100% $SO_2$ with dilute $SO_2$ such as:

Carry-through of unreacted $SO_2$ due to an increase in the flow rate to compensate for the dilute concentration of $SO_2$;

Possible oxidation of calcium thiosulfate resulting in $CaSO_3$ and/or $CaSO_4^{solid}$, due to the presence of oxygen and $SO_2$ in the real gas mixture. Tests were performed to investigate these possibilities. $SO_2$ was mixed with the excess amount of air and the mixture was used as a source of $SO_2$. Due to the presence of air, the following oxidation-reduction reaction is possible:

$$2CaS_2O_3 + O_2 \rightarrow 2CaSO_4 + 2S$$

For the systematic study, compressed $SO_2$/air gas mixture (14.56 vol % $SO_2$) was used and $N_2$ was intentionally substituted with air to replicate the commercial conditions. Observations from the test:
1. No considerable excess oxidation of calcium thiosulfate occurred due to presence of oxygen.
2. No significant $SO_2$ carry-through was observed during the step (ii) of the process.

The reaction between sulfur dioxide and lime-sulfur can be performed in a batch manner in the same equipment where the lime-sulfur is produced, or it can be performed in separate dedicated equipment. The lime-sulfur or calcium polysulfide slurry is cooled to the preferred temperature for reaction with sulfur dioxide. Preferably, the reaction mixture is maintained in the range of about 55° C.-75° C. during the step of reacting the slurry with the sulfur dioxide. Reaction temperatures above 75° C. (167° F.) should be avoided during conversion of lime-sulfur (or calcium polysulfide) to calcium thiosulfate because of possible losses due to thermal decomposition. The reaction of sulfur dioxide with calcium polysulfide is exothermic and excess heat generated during $SO_2$ addition is removed to maintain the desired temperature.

An important consideration in maintaining a good reaction rate and complete conversion of the lime-sulfur (or calcium polysulfide) intermediate to calcium thiosulfate is to provide adequate gas/liquid contacting area and time for the sulfur dioxide gas and the liquid lime-sulfur (or calcium polysulfide) slurry to react. Contact area is important because the reaction primarily takes place at the $SO_2$ gas/liquid slurry interface. If this interface area is not adequate, the reaction will be slow, leading to larger amounts of undesirable byproducts.

Many common types of gas/liquid contacting process equipment can be utilized for contacting and reacting the gas and liquid. These include, but are not limited to bubble columns, packed columns, tray columns, spray columns, mechanically agitated tanks, jet loops, venturi ejector/eductor, pipes/tubes and static mixers.

Figure 4:
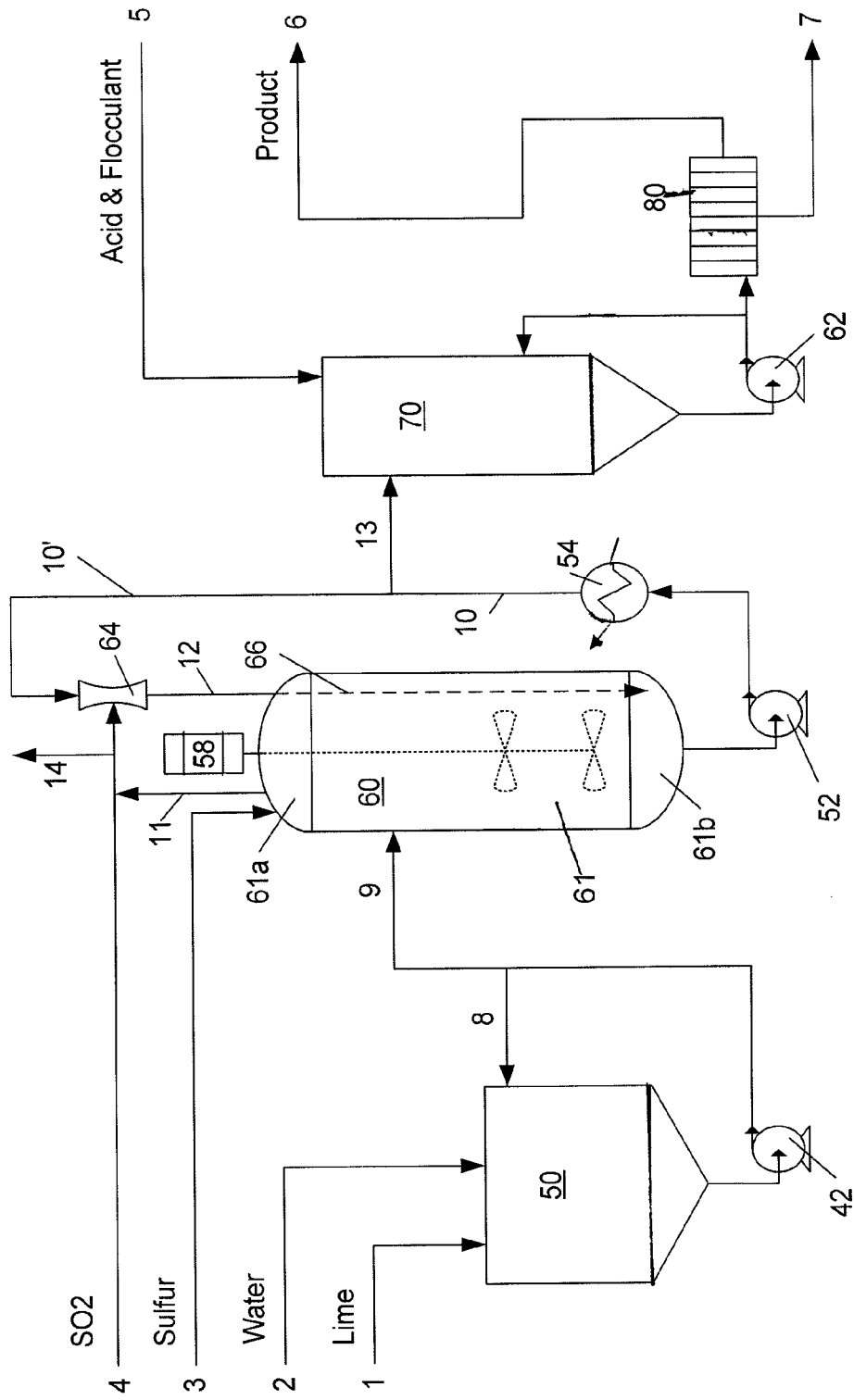
FIG. 4 is a process flow diagram, including a schematic illustration of a contactor/reactor, in accordance with a preferred embodiment of the present invention.

A special contactor was developed which utilizes elements of common types of contacting equipment combined into a single contactor-reactor design. The elements of this arrangement work to maximize contact time, area, and overall mass-transfer coefficient of reacting the lime-sulfur slurry (or calcium polysulfide slurry) and sulfur dioxide gas with recycled liquid/gas. This arrangement was described in U.S. Pat. No. 6,984,368, the entire disclosure of which is incorporated herein by reference, and is shown in FIG. 4 in which a contactor/reactor 60 in accordance with an embodiment of the invention, comprises (i) a bubble column 61, in which gas bubbles up through the liquid; (ii) a mechanical agitator 58, which further disperses bubbles within the column 61 to provide additional contact area time and mass-transfer; (iii) a venturi ejector/eductor, where accumulated gas at the top portion 61a of the column is ejected via a line 11 and educed through a venturi 64, where it is contacted with recirculated liquid/slurry 10; and (iv) a pipe/tube contactor where the gas/liquid mixture exiting the venturi 64 is further contacted as it is conducted inside a draft tube, back to the bottom portion 61b of the bubble column 61, where it is recombined with the liquid/slurry.

Mass Balance Check

A series of tests were performed to calculate mass balance between raw materials and product/byproduct. Results of one test are shown in Table 5.

TABLE 5

Mass balance check.

| Description | Incoming amount, g | Final products, g |
|---|---|---|
| $Ca(OH)_2$ | 728.1 | |
| S | 588.9 | |
| $H_2O$ | 5039.5 | |
| $SO_2$ | 313.4 | |
| CaTs solution | | 5589.7 |
| Recycled sulfur | | 146.2 |
| Solids | | 272.3 |
| Material, accumulated in the KOH trap | | 42.2 |
| Total | 6669.9 | 6050.4 |

The loss of material, as a difference between the total starting material and the final products, was 619.5 g (9.3%). Most of the loss occurred during step (i) due to water evaporation and vacuum filtration.

A further embodiment of the invention is one for the semi-continuous process of CaTs preparation, consisting of repetitive cycle. Each cycle involves two steps, described by the following equations:

(a) Preparation of the lime-sulfur solution (mixture of calcium polysulfide and calcium thiosulfate):

$$3Ca(OH)_2 + 2(x+1)S \rightarrow 2CaS_x + CaS_2O_3 + 3H_2O \quad (i)$$

(b) $SO_2$ sparging, resulting in conversion of calcium polysulfide into calcium thiosulfate:

$$CaS_x + CaS_2O_3 + SO_2 + H_2O \rightarrow 2CaS_2O_3 + H_2S + (x-2)S \quad (ii)$$

Figure 3:
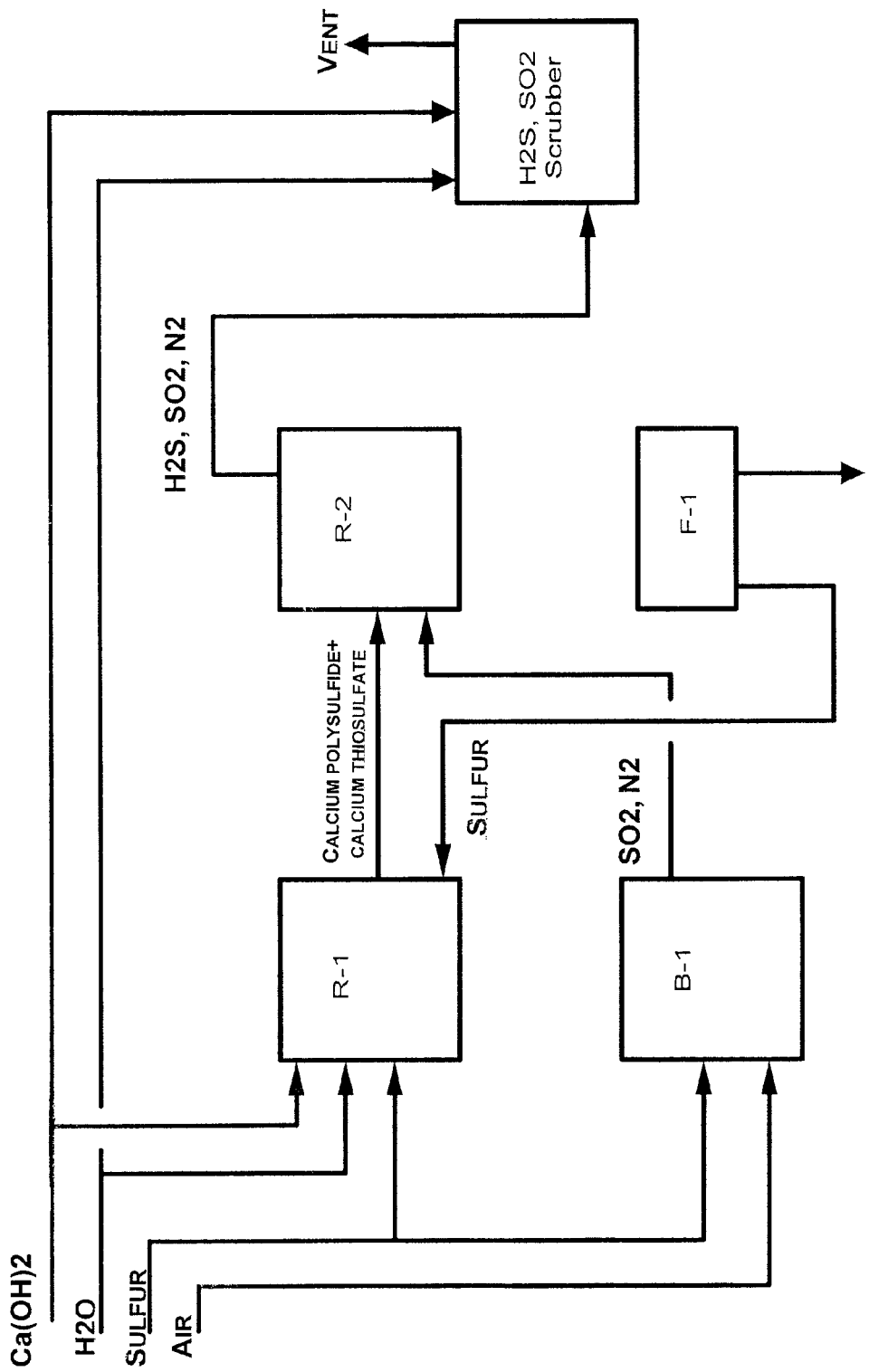
FIG. 3 is a graphical illustration of the process flow diagram for calcium thiosulfate preparation.

The flow diagram of the said process is shown in FIG. 3. Step (i) is the preparation of lime-sulfur from lime, sulfur, and water in the reactor R-1. By the end of step (i) the lime-sulfur product is transferred to filtering unit F-1 (this step is not shown in FIG. 3). Solids are separated. The filtrate is transferred to the reactor R-2 and reacted with sulfur dioxide [step (ii)]. The required $SO_2$ is provided from sulfur burner B-1. The final product prepared in reactor R-2 is filtered in the filtering unit F-2 (not shown) and is transferred to the storage tank. The solids from filtering units F-1, and F-2 are combined and analyzed for their sulfur and lime content and transferred back to R-1. This unreacted sulfur that is transferred back to R-1 is referred to herein as "recycled sulfur". The deficient amount of sulfur and/or lime is added and the cycle continues.

$H_2S$, generated during the step (ii) in the reactor R-2, is vented to a scrubber containing caustic soda or can be recycled to the sulfur burner along with unreacted $SO_2$, if any.

The process described above eliminates formation of $CaSO_3$ (solid) during the step (ii) by limiting the potential reaction of unreacted $Ca(OH)_2$, remaining after step (i), with $SO_2$.

A preferred embodiment of the process of the invention is as follows:

Step (i):
The molar ratio $S:Ca(OH)_2:H_2O=3.6:1:25.5$, when pure sulfur feed is used;
The molar ratio $S:Ca(OH)_2:H_2O=(3.6-4.9):1:25.5$, when recycled sulfur is used;
Pure feed sulfur and recycled sulfur should be used separately to attain predictable results by the end of step (i) ($C_{Ca}$ in the lime-sulfur solution and relative amount of the unreacted solids);
Duration: 30-35 min.
When pure sulfur is used, the endpoint of the reaction can be monitored by color: dark reddish-brown and clear signifies a complete reaction;
Temperature: 200° F.-210° F. (210° F. is near the boiling point).
Immediate filtration of the lime-sulfur product by the end of step (i);
To determine lime-sulfur concentration for 25 wt % calcium thiosulfate production, samples are taken and analyzed at the end of each step (i). In a case where the lime-sulfur solution contains lower than projected calcium thiosulfate concentration ($C_{Ca}$), the deficient amount of calcium and sulfur are added and additional step (i) performed.
Step (ii):
Sparging of the $SO_2/N_2/O_2$ gas mixture into lime-sulfur until pH drops to approximately 4. The low pH guarantees the final calcium thiosulfate solution will be free from $H_2S$, which is a side-product of the step (ii).

Filtration of the final product. Solids, termed as "recycled sulfur", consist mostly of sulfur. The solids are recycled to the reactor R-1 as a part of the sulfur feed material.

pH of the final calcium thiosulfate solution is adjusted to 7.0-7.5 via addition of lime. Continuous agitation is necessary to have a steady state pH reading. Afterwards the CaTs solution is filtered again.

The reason why pure sulfur and recycled sulfur are preferably used separately is because it is desirable for the user of the process to be able to predict with some certainty what will be the concentration of calcium in the lime-sulfur solution and what will be the concentration of calcium in the unreacted solids at the end of step (i). Using pure sulfur permits one to predict with greater certainty what the concentration of calcium will be. In contrast, when recycled sulfur is used, it is difficult to predict with certainty how concentrated the aforementioned calcium levels will be, because with recycled sulfur it is more difficult to predict how high the level of S is in the recycled sulfur, and it is also difficult to predict how pure and how wet (i.e., how much water it contains) the recycled sulfur is.

Mass balance check for a semi-continuous seven cycle process is shown in Table 6.

TABLE 6

Mass Balance Check of the Seven-Cycle Process.

| | Incoming amount, g | | | | Outgoing amount, g | | |
|---|---|---|---|---|---|---|---|
| Cycle # | $Ca(OH)_2$, g | S, g | $H_2O$, g | $SO_2$, g | CaTs solution, g | Loss, g | $H_2S$, g |
| I | 62.25 | 54.14 | 410 | not avail. | 394.7 | 12.97 | 0 |
| II | 62.25 | 27.07 | 400 | | | | |
| III | 0 | 17.96 | 199 | (II + III) cycles: 19.9 | (II + III) cycles: 607.1 | (II + III) cycles: 72.56 | (II + III) cycles: 0 |
| IV | 108.24 | 14.4 | 651 | 32.2 | 715.9 | 13.92 | 0 |
| V | 110.46 | 40.61 | 550 | 31.2 | 674.9 | 7.84 | 0 |
| VI | 0 | 69.98 | 689 | 43.6 | 816.8 | 27.04 | 0 |
| VII | 0 | 64.36 | 622 | 4.9+ | 749.5 | 24.57 | 0 |
| Total | 343.2 | 288.26 | 3521 | 131.8 | 3958.9 | 158.9 | 0 |

The total incoming amount: 4284.26 g.
The total outgoing amount: 4117.8 g+20.53 g (solids from VII)+87.07 g=4225.4 g.
Loss as a difference between the incoming and outgoing amounts: 58.86 g (1.4 wt %).
Yield: 3958.9:4284.26=92.4%.

The calcium thiosulfate produced according to the invention is an emulsion of liquid calcium thiosulfate and solid byproducts. This emulsion is preferably further treated to produce a solution that may be readily filtered. For example, the emulsion may be treated with a flocculent and acidified to a near neutral pH, to produce a colloidal solution that filters with ease. The resulting calcium thiosulfate is a clear liquid with a concentration of up to about 29% by weight.

What is claimed is:
1. A process for preparing calcium thiosulfate comprising the following steps:
(a) providing a calcium hydroxide slurry;
(b) adding sulfur to the slurry;
(c) reacting the slurry to form a calcium polysulfide reaction mixture by consuming substantially all the calcium hydroxide;

(d) adding sulfur dioxide to the reaction mixture that is substantially free of calcium hydroxide, and reacting at about atmospheric pressure under conditions sufficient to form a calcium thiosulfate solution; and (e) recovering the calcium thiosulfate.

2. The process of claim 1 wherein step (b) further comprises adding sulfur at a sulfur to calcium hydroxide mole ratio of from about 1:1 to about 6:1.

3. The process of claim 2 wherein step (b) further comprises adding sulfur at a sulfur to calcium hydroxide mole ratio of from about 3.5:1 to about 6:1.

4. The process of claim 2 wherein step (b) further comprises adding sulfur at a sulfur to calcium hydroxide mole ratio of from about 3.4:1 to about 3.8:1.

5. The process of claim 3 wherein step (b) further comprises adding sulfur at a sulfur to calcium hydroxide mole ratio of about 3.6:1.

6. The process of claim 1 wherein step (b) further comprises adding sulfur at a sulfur to calcium hydroxide to water mole ratio of at least about 2:6:30.

7. The process of claim 6 wherein step (b) further comprises adding sulfur at a sulfur to calcium hydroxide to water mole ratio of about 3.6 to 4.9:1:25.5.

8. The process of claim 7 wherein step (b) further comprises adding sulfur at a sulfur to calcium hydroxide to water mole ratio of about 3.6:1:25.5.

9. The process of claim 1 wherein step (c) further comprises reacting the slurry at a temperature of least about 70° C. to form a calcium polysulfide reaction mixture.

10. The process of claim 9 wherein step (c) further comprises reacting the slurry at a temperature of about 85° C. to about 99° C. to form a calcium polysulfide reaction mixture.

11. The process of claim 10 wherein step (c) further comprises reacting the slurry at a temperature of about 90° C. to about 92° C. to form a calcium polysulfide reaction mixture.

12. The process of claim 1 wherein step (c) further comprises cooling the polysulfide reaction mixture to a temperature of about 55° C. to about 75° C.

13. The process of claim 1 wherein step (a) further comprises a step of forming said calcium hydroxide slurry by combining calcium oxide and water.

14. The process of claim 1, wherein the calcium oxide is about 96% to about 99% pure.

15. The process of claim 1 wherein step (d) further comprises reacting at a temperature of about 82° C. to about 95° C.

16. The process of claim 15 wherein step (d) further comprises reacting at a temperature of about 85° C. to about 88° C.

17. The process of claim 1 wherein step (d) further comprises dropping pH to about 3 to about 6.

18. The process of claim 17 wherein step (d) further comprises dropping pH to about 3.5 to about 4.

19. The process of claim 1 wherein step (d) further comprises stopping addition of further sulfur dioxide and agitating until pH is in the range of about 7 to about 7.5.

20. The process of claim 1 wherein step (e) further comprises using a flocculent to recover the calcium thiosulfate.

21. A process for preparing calcium thiosulfate comprising the following steps:
(a) providing a calcium hydroxide slurry;
(b) adding sulfur to the slurry at a sulfur to calcium hydroxide to water mole ratio of at least about 2:6:30;
(c) reacting the slurry at a temperature of at least about 70° C. to consume substantially all the calcium hydroxide and to form a calcium polysulfide reaction mixture;

(d) cooling the calcium polysulfide reaction mixture to a temperature of about 55° C. to about 75° C.;
(e) adding sulfur dioxide to the reaction mixture and reacting at about atmospheric pressure, a temperature of about 82° C. to about 95° C., and a pH of about 3 to about 6, to form a calcium thiosulfate solution; and
(f) recovering the calcium thiosulfate.

22. The process of claim 21 wherein the process is carried out in gas/liquid contacting process equipment selected from group consisting of bubble columns, packed columns, tray columns, spray columns, mechanically agitated tanks, jet loops, venturi ejector/eductor/pipes/tubes, and static mixers.

23. A process for preparing calcium thiosulfate comprising the following steps:
(a) providing a lime-sulfur slurry that is substantially free of calcium hydroxide;
(b) adding sulfur dioxide to the slurry and reacting the slurry at about atmospheric pressure under conditions sufficient to form a calcium thiosulfate solution; and
(c) recovering the calcium thiosulfate.

24. The process of claim 23, wherein step (b) further comprises reacting at a temperature of about 82° C. to about 95° C.

25. The process of claim 24 wherein step (b) further comprises reacting at a temperature of about 85° C. to about 88° C.

26. The process of claim 23 wherein step (b) further comprises dropping pH to about 3 to about 6.

27. The process of claim 26 wherein step (b) further comprises dropping pH to about 3.5 to about 4.

28. The process of claim 23 wherein step (b) further comprises stopping addition of further sulfur dioxide and agitating until pH rises to about 7 to about 7.5.

29. The process of claim 23 wherein step (c) further comprises using a flocculent to recover the calcium thiosulfate.

30. A process for preparing calcium thiosulfate comprising the following steps:
(a) providing a lime-sulfur slurry that is substantially free of calcium hydroxide;
(b) adding sulfur dioxide to the slurry and reacting at about atmospheric pressure, at a temperature of about 82° C. to about 95° C., and a pH of about 3 to about 6, to form a calcium thiosulfate solution; and
(c) recovering the calcium thiosulfate.

31. The process of claim 30 wherein the process is carried out in gas/liquid contacting process equipment selected from group consisting of bubble columns, packed columns, tray columns, spray columns, mechanically agitated tanks, jet loops, venturi ejector/eductor/pipes/tubes, and static mixers.

32. A process for preparing calcium thiosulfate comprising the following steps:
(a) providing a calcium polysulfide slurry;
(b) adding sulfur dioxide to the slurry;
(c) reacting the slurry at about atmospheric pressure under conditions sufficient to form a calcium thiosulfate solution; and
(d) recovering the calcium thiosulfate.

33. The process of claim 32, wherein step (b) further comprises reacting at a temperature of about 82° C. to about 95° C.

34. The process of claim 33 wherein step (b) further comprises reacting at a temperature of about 85° C. to about 88° C.

35. The process of claim 32 wherein step (b) further comprises dropping pH to about 3 to about 6.

36. The process of claim 35 wherein step (b) further comprises dropping pH to about 3.5 to about 4.

37. The process of claim 32 wherein step (b) further comprises stopping addition of further sulfur dioxide and agitating until pH rises to about 7 to about 7.5.

38. The process of claim 32 wherein step (c) further comprises using a flocculent to recover the calcium thiosulfate.

39. A process for preparing calcium thiosulfate comprising the following steps:
  (a) providing a calcium polysulfide slurry that is substantially free of calcium hydroxide;
  (b) adding sulfur dioxide to the slurry and reacting at atmospheric pressure at a temperature of about 82° C. to about 95° C. and a pH of about 3 to about 6, to form a calcium thiosulfate solution; and
  (c) recovering the calcium thiosulfate.

40. The process of claim 39 wherein the process is carried out in gas/liquid contacting process equipment selected from group consisting of bubble columns, packed columns, tray columns, spray columns, mechanically agitated tanks, jet loops, venturi ejector/eductor/pipes/tubes, and static mixers.

41. The process of claim 1 wherein the sulfur dioxide is obtained from waste gases.

42. The process of claim 23 wherein the sulfur dioxide is obtained from waste gases.

43. The process of claim 32 wherein the sulfur dioxide is obtained from waste gases.

44. The process of claim 23, wherein step (b) comprises reacting the slurry in a first vessel, then filtering the reacted slurry to form a filtrate, then transferring the filtrate to a second vessel and adding additional sulfur dioxide to the filtrate in the second vessel.

45. The process of claim 1, wherein step (d) further comprises stopping addition of sulfur dioxide when the reaction mixture's pH is about 4.

46. The process of claim 45, wherein step (d) further comprises removing excess $SO_2$.

47. The process of claim 46, wherein step (d) further comprises adding calcium hydroxide to adjust the solution's pH to about 7 to about 7.5.

* * * * *